United States Patent
List et al.

(10) Patent No.: US 9,651,963 B2
(45) Date of Patent: May 16, 2017

(54) INTEGRATED REGULATOR, IN PARTICULAR A VOLTAGE REGULATOR, AND A CONTROL UNIT FOR OCCUPANT PROTECTION MEANS

(71) Applicant: Robert Bosch GmbH, Stuttgart (DE)

(72) Inventors: Carsten List, Walheim (DE); Hartmut Schumacher, Freiberg (DE); Falko Sievers, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/406,069

(22) PCT Filed: May 14, 2013

(86) PCT No.: PCT/EP2013/059874
§ 371 (c)(1),
(2) Date: Dec. 5, 2014

(87) PCT Pub. No.: WO2013/182386
PCT Pub. Date: Dec. 12, 2013

(65) Prior Publication Data
US 2015/0153752 A1   Jun. 4, 2015

(30) Foreign Application Priority Data

Jun. 6, 2012  (DE) ............... 10 2012 209 582

(51) Int. Cl.
*G05F 1/56*    (2006.01)
*G05F 1/575*   (2006.01)
*B60R 21/017*  (2006.01)

(52) U.S. Cl.
CPC ............ *G05F 1/575* (2013.01); *B60R 21/017* (2013.01); *G05F 1/56* (2013.01)

(58) Field of Classification Search
CPC .................................. G05F 1/56; G05F 1/575
(Continued)

(56) References Cited

U.S. PATENT DOCUMENTS 5,642,035 A *   6/1997  Ragsdale ...................... 323/282
8,319,559 B2 * 11/2012  Kocer et al. ................... 330/296
2011/0285456 A1* 11/2011  Thornton et al. ............. 327/541

FOREIGN PATENT DOCUMENTS

| DE | 602005005060 | 6/2009 |
| DE | 102009047480 | 6/2011 |
| DE | 102010043100 | 12/2011 |

OTHER PUBLICATIONS

International Search Report for PCT/EP2013/059874, issued on Jul. 25, 2013.
(Continued)

*Primary Examiner* — Adolf Berhane
*Assistant Examiner* — Nusrat Quddus
(74) *Attorney, Agent, or Firm* — Norton Rose Fulbright US LLP

(57) ABSTRACT

An integrated regulator is described, in particular a voltage regulator for occupant protection means in a vehicle, including a regulating element, which converts an input signal into an output signal having a predefined value, and a trigger circuit, which activates the regulating element to generate the output signal having the predefined value. A configuration circuit is provided, which receives and evaluates at least one configuration signal and deactivates the regulating element as a function of the evaluation.

16 Claims, 1 Drawing Sheet

(58) Field of Classification Search
USPC .......................................... 323/271–285, 351
See application file for complete search history.

(56) References Cited

OTHER PUBLICATIONS

William Lepkowski, "Using the Enable Pin in a Linear Regulator As a Voltage Supervisor", AND/D, 2005, pp. 1-6.

* cited by examiner

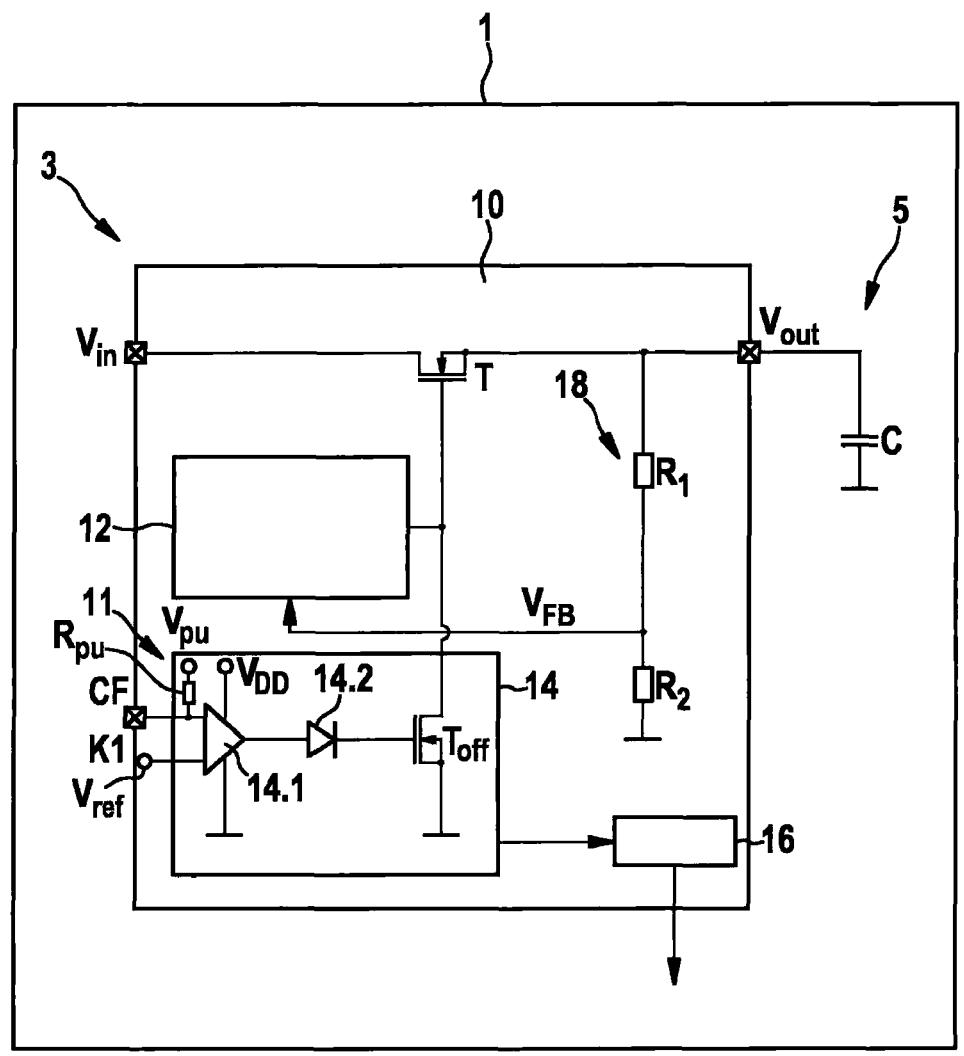

US 9,651,963 B2

INTEGRATED REGULATOR, IN PARTICULAR A VOLTAGE REGULATOR, AND A CONTROL UNIT FOR OCCUPANT PROTECTION MEANS

FIELD OF THE INVENTION

The present invention is directed to an integrated regulator, in particular a voltage regulator, for occupant protection means in a vehicle, and to a control unit for activating occupant protection means in a vehicle.

BACKGROUND INFORMATION

Control units for activating occupant protection means in a vehicle known from the related art are characterized, among other things, in that all supply voltages which are required for operating the occupant protection system are generated within the occupant protection system itself In this way, it is possible to ensure that correct functionality is provided, independently of fluctuations of the battery voltage in the vehicle. The voltage regulators used may be designed as linear regulators and/or DC/DC converters, for example, and may provide fixedly predefined output voltages, such as 6.7 V, 5.0 V, 3.3 V, for directly supplying other system components, such as microcontrollers, sensors, communication interfaces, lamp drivers and the like.

The output voltages of the extra-low voltage regulators (5.0 V and 3.3 V) may be monitored by a system ASIC (application-specific integrated circuit) itself, an enabling or triggering of a reset signal being derivable from the monitoring of the output voltages. The reset signal may, in turn, be used to enable or to activate, or to reset, the occupant protection system, i.e., to transfer it into a safe state in which the occupant protection system provides no functionality. Thus, to provide the full functionality of the occupant protection system, the monitored voltages must be available and within the allowed range. However, there is no option in present occupant protection systems for deactivating the voltage regulators or for suspending the monitoring of the output signals of the voltage regulators. It is thus always necessary for all voltage regulators to be connected to correct external components, so that the regulated voltages are stable and their monitoring functions robustly. This is also necessary if the output voltage of one regulator, such as 5.0 V, in the specific occupant protection system is not even used due to customer requirements. It is also possible that not all voltage regulators are required in occupant protection systems in which multiple system ASICs are combined; nonetheless, all existing voltage regulators must be correctly connected to prevent the occupant protection system from remaining in the reset state. Comparable, freely available system ASICs for occupant protection systems also offer no option of deactivating individual integrated regulators if these are monitored and used to generate the reset signal.

The German Published Patent Application No. 10 2009 047 480 A1, for example, describes a control unit and a method for activating occupant protection means for a vehicle. The described control unit includes a supply module, which converts an input voltage for the activation of the occupant protection means. A voltage regulator, which limits the input voltage to a predefined first value, is connected between a vehicle supply voltage and the input voltage of the supply module. A shutoff circuit, which shuts off the voltage regulator as a function of the vehicle supply voltage, is connected upstream from the voltage regulator, the shutoff circuit checking the vehicle supply voltage against a second value and shutting off the voltage regulator if this second value is exceeded.

SUMMARY

The integrated regulator according to the present invention for occupant protection means in a vehicle and a corresponding control unit for activating occupant protection means including such an integrated regulator have the advantage over the related art that individual integrated regulators of an occupant protection system, preferably voltage regulators, may be deactivated. In this way, the appropriate monitoring of the corresponding output signal and the influence of the output signal monitoring on the generation of a reset signal for the occupant protection system may also advantageously be shut off. Moreover, a shut-off or deactivated integrated regulator does not have to be connected to external components, so that the component costs may be reduced. The shutoff or deactivation of the integrated regulator according to the present invention takes place, for example, via a separate configuration pin, which is appropriately activated. Additionally, a configuration recognized based on the configuration pin may be stored and read out via a read-out command using software and verified.

The core of the present invention is to be able to deactivate or shut off individual integrated regulators in a system ASIC of an occupant protection system in the event that their regulating signal is either not required at all in the overall system or is provided by another integrated regulator. The deactivated or shut-off regulator then no longer must be connected to external components, such as regulating capacitors, inductors, ohmic resistors or diodes. In this way, unnecessary costs may be avoided. In addition, the robustness of the occupant protection system increases since the shut-off integrated regulator is not able to generate any impermissible signals. This would be the case if the integrated regulator were left activated and only the regulating capacitors or other external components were reduced or removed, since then a highly fluctuating output voltage (oscillation) could be created, which could influence other circuit components of the occupant protection system. This may result in cross coupling within the system ASIC and in the generation of the reset signal, for example, since the integrated regulators are monitored for the generation of the reset signal. A further advantage is that the present configuration of the integrated regulator according to the present invention may be verified with the aid of a software query and, in this way, faultily activated or deactivated integrated regulators may be detected, so that a clear fault allocation is possible.

Specific embodiments of the present invention provide an integrated regulator, in particular a voltage regulator for occupant protection means in a vehicle, including a regulating element, which converts an input signal into an output signal having a predefined value, and a trigger circuit, which activates the regulating element to generate the output signal having the predefined value. According to the present invention a configuration circuit is provided, which receives and evaluates at least one configuration signal and deactivates the regulating element as a function of the evaluation.

Moreover, a control unit for activating occupant protection means in a vehicle having a regulator system is provided, which regulates at least one voltage in the control unit. According to the present invention, the regulator system includes at least one integrated regulator according to the present invention.

It is particularly advantageous that the at least one configuration signal may be generated with the aid of a pin configuration. To generate a first logic signal level for the at least one configuration signal, a corresponding connecting pin is fixedly connected to ground. To generate a second logic signal level for the at least one configuration signal, a corresponding connecting pin is left unused. Moreover, a pull-up circuit situated inside or outside the integrated regulator may bring a connecting pin which is left unused to the second logic signal level. Such a pull-up circuit preferably includes an ohmic resistor which is connected to a predefined voltage potential, which preferably represents the second logic signal level.

Generating the at least one configuration signal via the pin configuration advantageously allows a simple and cost-effective implementation of the integrated regulator according to the present invention. If multiple regulators are integrated into the control unit, a separate configuration pin may be provided for each regulator to deactivate the corresponding integrated regulator.

In one advantageous embodiment of the integrated regulator according to the present invention, the configuration circuit may include a comparator for the evaluation of the at least one configuration signal, the comparator comparing the at least one configuration signal to a reference voltage. The comparator may trigger a switching element, preferably a switching transistor, as a function of the comparison to deactivate or shut off the regulating element.

In one further advantageous embodiment of the integrated regulator according to the present invention, the configuration circuit may carry out the evaluation of the at least one configuration signal during a system initialization. In this way, the correct output signal is already available considerably earlier than in the case of software programming To improve the fault diagnosis, the configuration circuit may lock the detected configuration (deactivate or shut off regulating element, or leave regulating element activated or operable) and store it in a status memory. By locking the detected configuration, it is advantageously preventable that, during operation, a change in the configuration may be caused by faults which occur, for example by an EMC influence.

In one further advantageous embodiment of the integrated regulator according to the present invention, the trigger circuit may activate the regulating element as a function of a feedback signal to generate the output signal having the predefined value. The feedback signal may preferably be generated from the output signal by at least one integrated voltage divider having a predefined divider ratio.

One exemplary embodiment of the present invention is shown in the drawing and is described in greater detail in the following description. In the drawing, identical reference numerals denote components or elements which carry out the same or similar functions.

BRIEF DESCRIPTION OF THE DRAWING

The single FIGURE shows a schematic block diagram of a detail of a control unit for occupant protection means including one exemplary embodiment of an integrated regulator according to the present invention.

DETAILED DESCRIPTION

Integrated voltage regulators known from the related art offer the option of generating different, fixedly predefined output voltages. For example, different embodiment variants exist of many voltage regulators, which differ only in the output voltage to be regulated, however a separate regulator having to be used for each voltage value. There are also voltage regulators, whose output voltage is variably adjustable by adapting an external voltage divider. This is done by regulation to a fixedly predefined feedback voltage of 1.2 V, for example, which is scaled down from an output voltage of the regulator with the aid of an external voltage divider including at least two resistors. By varying this voltage divider, the output voltage of the regulator may be adjusted, which is always higher than the feedback voltage. The existing variable circuits are usually highly prone to errors. A single error on one of the external voltage divider resistors may directly result in an incorrect and potentially damaging output voltage. Fault detection is usually possible only with difficulty since the regulator itself is not able to distinguish between a resistance value which is too high or too small due to a fault and a resistance value which is consciously selected to be too high or too low.

Detailed Description Of The Invention

As is apparent from the single figure, the shown exemplary embodiment of an integrated regulator 10 according to the present invention, which in the shown exemplary embodiment is designed as a voltage regulator for occupant protection means in a vehicle, includes a regulating element T, which converts an input signal $V_{in}$, into an output signal $V_{out}$ having a predefined value, and a trigger circuit 12, which activates the regulating element T as a function of a feedback signal $V_{FB}$ to generate the output signal $V_{out}$ having the predefined value. According to the present invention a configuration circuit 14 is provided, which receives and evaluates at least one configuration signal CF and deactivates or shuts off the regulating element T as a function of the evaluation.

As is furthermore apparent from the single figure, an integrated voltage divider 18, having two resistors R1, R2, which have a predefined divider ratio R1/R2, generates the feedback signal $V_{FB}$ from the output signal $V_{out}$.

As is furthermore apparent from the single figure, integrated regulator 10 is designed as an ASIC (application-specific integrated circuit) component in the shown exemplary embodiment and is part of a regulator system 3 in a control unit 1 for occupant protection means. In the shown exemplary embodiment, integrated regulator 10 includes a configuration pin K1, an input pin at which input signal $V_{in}$ is present, and an output pin for outputting output signal $V_{out}$, an external circuitry 5 which in the shown exemplary embodiment includes a capacitor C being provided at the output pin. In addition or as an alternative, external circuitry 5 may also include other or further external components, such as inductors, ohmic resistors or diodes. As an alternative, regulator 10 according to the present invention, however, may also be integrated into a system ASIC (application-specific integrated circuit) component of a control unit 1 of the occupant protection system.

Regulator 10 according to the present invention implemented as a voltage regulator offers the option of deactivating or shutting off regulating element T, or leaving regulating element T activated or operable. The selection of the desired configuration takes place via configuration pin K1. The status of configuration pin K1 is either a logic low level (L), which is implemented by an external short circuit of configuration pin K1 to ground, or a logic high level (H), which is implemented by an unused configuration pin K1. In the shown exemplary embodiment, a pull-up circuit 11 situated within integrated regulator 10 brings an unused configuration pin K1 to the logic high level (H). Pull-up circuit 11 includes a pull-up resistor $R_{pu}$, which at one terminal is connected to the appropriate configuration pin K1 and at the other terminal to a pull-up voltage $V_{pu}$, whose level approximately corresponds to the logic high level (H). The level of configuration pin K1 is read back as configuration signal CF by configuration circuit 14 and evaluated. The status is detected, for example, with the aid of a voltage comparator 14.1, which compares configuration signal CF to a reference voltage $V_{ref}$. In the shown exemplary embodiment, the logic low level (L) is used to deactivate or shut off regulating element T, and the logic high level (H) is used to leave regulating element T activated or operable.

The detected logic low level (L) is used to permanently block or deactivate regulating element T in the event of a deactivation. In the shown exemplary embodiment, this is achieved by a switching element $T_{off}$ situated in configuration circuit 14, the switching element preferably being designed as a field-effect transistor and activated by comparator 14.1 via an inverter 14.2. Switching element $T_{off}$ short-circuits the control input of regulating element T, which is preferably designed as a field-effect transistor, to ground so that regulating element T is permanently deactivated. In this way, external circuitry 5 may be omitted, which is necessary during operation for the stabilization and function of integrated regulator 10. In shown linear regulator 10, only one capacitor C is required as external circuitry 5. In alternative exemplary embodiments, which are not shown, such as a DC/DC converter, additionally or alternatively inductors, ohmic resistors and diodes may also be necessary. The detected present configuration of integrated regulator 10 may be stored in suitable storage means 16, which in the shown exemplary embodiment are integrated into regulator 10. As an alternative, storage means 16 may also be situated outside regulator 10 in control unit 1.

In control unit 1, the monitoring of output signal $V_{out}$ of a deactivated regulator 10 is shut off, so that output signal $V_{out}$ of deactivated regulator 10 is no longer considered in the generation of the reset signal. The stored configuration may subsequently be read out by a software query, detected faults being displayable. For robustness reasons, the evaluation of configuration signal CF at configuration pin K1, and the activation or deactivation of regulating element T associated therewith, are carried out at the beginning of the initialization phase of the system, as soon as the internal logic circuits of integrated regulator 10 according to the present invention have been sufficiently supplied, and prior to the overall system being enabled by the reset signal. After the initial read-in of configuration signal CF at configuration pin K1, the detected configuration is locked, so that any further change in the pin status no longer influences regulator 10. In this way, no inadvertent activation or deactivation of regulating element T may occur during normal operation, for example under the action of EMC. Moreover, the detected status of the configuration pins is stored in a storage means 16, which is preferably designed as a register. The storage means 16 may then be read out during operation by a software query, for example. In this way, a faulty status may be detected and a fault indication may be provided.

In alternative specific embodiments of the integrated regulator according to the present invention, which are not shown, the detection thresholds at the configuration pins and the type of the voltage supply may be implemented deviating from the shown exemplary embodiment. The shown exemplary embodiment of the integrated regulator according to the present invention uses an integrated pull-up circuit having an internal pull-up voltage. As an alternative, an external pull-up circuit, i.e., a pull-up circuit situated outside the integrated regulator, and a corresponding external pull-up voltage may also be used to generate the high level (H) at an unused configuration pin. Various voltage levels are also possible for detecting various logic states, for example connection to ground (GND) or to various voltage potentials, such as 5.0 V, 3.3 V or the like. Similar circumstances apply if, in addition to the logic high level and the logic low level, intermediate levels are detectable with the aid of additional voltage comparators. Specific embodiments of the integrated regulator according to the present invention may be designed as linear regulators or DC/DC converters, for example.

In a system ASIC or in the control unit of the occupant protection system, any arbitrary number of regulators may be designed to be deactivatable.

What is claimed is:

1. An integrated regulator, comprising:
   a regulating element that converts an input signal into an output signal having a predefined value;
   a trigger circuit that activates the regulating element to generate the output signal having the predefined value; and
   a configuration circuit that receives and evaluates at least one configuration signal and deactivates the regulating element as a function of the evaluation;
   wherein the configuration circuit is configured to lock a detected logic state of the at least one configuration signal and to store the detected logic state in a status memory.

2. The integrated regulator as recited in claim 1, wherein the integrated regulator is a voltage regulator for an occupant protection arrangement in a vehicle.

3. An integrated regulator, comprising:
   a regulating element that converts an input signal into an output signal having a predefined value;
   a trigger circuit that activates the regulating element to generate the output signal having the predefined value; and
   a configuration circuit that receives and evaluates at least one configuration signal and deactivates the regulating element as a function of the evaluation;
   wherein the at least one configuration signal is generatable with the aid of a pin configuration,
   wherein a corresponding connecting pin is fixedly connected to ground to generate a first logic signal level for the at least one configuration signal, and
   wherein the corresponding connecting pin is left unused to generate a second logic signal level for the at least one configuration signal.

4. The integrated regulator as recited in claim 3, further comprising:
   a pull-up circuit situated one of inside and outside the integrated regulator and for bringing the connecting pin which is left unused to the second logic signal level.

5. The integrated regulator as recited in claim 1, wherein the configuration circuit includes a comparator for evaluating the at least one configuration signal, the comparator comparing the at least one configuration signal to a reference voltage.

6. An integrated regulator, comprising:
   a regulating element that converts an input signal into an output signal having a predefined value;
   a trigger circuit that activates the regulating element to generate the output signal having the predefined value; and a configuration circuit that receives and evaluates at least one configuration signal and deactivates the regulating element as a function of the evaluation;
wherein the configuration circuit includes a comparator for evaluating the at least one configuration signal, the comparator comparing the at least one configuration signal to a reference voltage, and
wherein the comparator is configured to activate a switching element as a function of the comparison to deactivate the regulating element.

7. The integrated regulator as recited in claim 6, wherein the switching element includes a switching transistor.

8. The integrated regulator as recited in claim 1, wherein the configuration circuit carries out the evaluation of the at least one configuration signal during a system initialization.

9. The integrated regulator as recited in claim 3, wherein the configuration circuit locks a detected logic state of the at least one configuration signal and stores the detected logic state in a status memory.

10. The integrated regulator as recited in claim 1, wherein the trigger circuit activates the regulating element as a function of a feedback signal to generate the output signal having the predefined value.

11. The integrated regulator as recited in claim 10, further comprising:
at least one integrated voltage divider having a predefined divider ratio to generate the feedback signal from the output signal.

12. A control unit for activating an occupant protection arrangement in a vehicle, comprising:
a regulator system to regulate at least one voltage in the control unit, wherein the regulator system includes at least one integrated regulator, which includes:
a regulating element to convert an input signal into an output signal having a predefined value;
a trigger circuit to activate the regulating element to generate the output signal having the predefined value; and
a configuration circuit to receive and evaluate at least one configuration signal and to deactivate the regulating element as a function of the evaluation;
wherein the configuration circuit is configured to lock a detected logic state of the at least one configuration signal and to store the detected logic state in a status memory.

13. The control unit as recited in claim 12, wherein the configuration circuit includes a comparator for evaluating the at least one configuration signal, the comparator comparing the at least one configuration signal to a reference voltage, and wherein the comparator is configured to activates a switching element as a function of the comparison to deactivate the regulating element.

14. The control unit as recited in claim 12, wherein the at least one configuration signal is generatable with a pin configuration, wherein a corresponding connecting pin is fixedly connected to ground to generate a first logic signal level for the at least one configuration signal, and wherein the corresponding connecting pin is left unused to generate a second logic signal level for the at least one configuration signal.

15. The integrated regulator as recited in claim 1, wherein the configuration circuit includes a comparator for evaluating the at least one configuration signal, the comparator comparing the at least one configuration signal to a reference voltage, and wherein the comparator is configured to activates a switching element as a function of the comparison to deactivate the regulating element.

16. The integrated regulator as recited in claim 1, wherein the at least one configuration signal is generatable with a pin configuration, wherein a corresponding connecting pin is fixedly connected to ground to generate a first logic signal level for the at least one configuration signal, and wherein the corresponding connecting pin is left unused to generate a second logic signal level for the at least one configuration signal.

* * * * *